(12) United States Patent
Choi et al.

(10) Patent No.: US 8,650,593 B2
(45) Date of Patent: Feb. 11, 2014

(54) BROADCAST RECEIVING APPARATUS TO PROVIDE EXTERNAL DEVICES WITH A LIST OF RECORDED FILES, METHOD FOR PROVIDING RECORDED FILE, AND SYSTEM USING THE SAME

(75) Inventors: Seung-hyuk Choi, Suwon-si (KR); Seung-seop Shim, Anyang-si (KR); Moon-seok Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 508 days.

(21) Appl. No.: 12/428,870

(22) Filed: Apr. 23, 2009

(65) Prior Publication Data

US 2009/0300678 A1    Dec. 3, 2009

(30) Foreign Application Priority Data

May 27, 2008   (KR) .......................... 10-2008-0049211

(51) Int. Cl.
*H04N 5/445* (2011.01)
(52) U.S. Cl.
USPC ................... 725/44; 725/39; 725/40; 725/41
(58) Field of Classification Search
None
See application file for complete search history.

(56) References Cited

U.S. PATENT DOCUMENTS

| | | | | |
|---|---|---|---|---|
| 6,774,926 | B1* | 8/2004 | Ellis et al. | 348/14.01 |
| 6,981,045 | B1* | 12/2005 | Brooks | 709/226 |
| 2001/0001160 | A1* | 5/2001 | Shoff et al. | 725/51 |
| 2002/0067909 | A1* | 6/2002 | Iivonen | 386/88 |
| 2004/0123327 | A1* | 6/2004 | Fai Ma et al. | 725/100 |
| 2005/0188413 | A1* | 8/2005 | Mohammed et al. | 725/112 |
| 2007/0083894 | A1* | 4/2007 | Gonsalves et al. | 725/46 |
| 2007/0157253 | A1* | 7/2007 | Ellis et al. | 725/61 |
| 2007/0162945 | A1* | 7/2007 | Mills | 725/119 |
| 2007/0186242 | A1* | 8/2007 | Price et al. | 725/46 |
| 2007/0296805 | A1* | 12/2007 | Tedenvall et al. | 348/14.01 |

FOREIGN PATENT DOCUMENTS

JP    2003-339041 A    11/2003

* cited by examiner

*Primary Examiner* — Cai Chen
(74) *Attorney, Agent, or Firm* — Sughrue Mion, PLLC

(57) ABSTRACT

A broadcast receiving apparatus, and a method and system for providing recorded files are provided. The broadcast receiving apparatus generates a recorded file list having information regarding addresses at which recorded files are stored, and transmits the generated recorded file list to an external apparatus. Therefore, a user may conveniently use files recorded on a TV.

26 Claims, 6 Drawing Sheets

FIG. 7

| Title | Description | Publication date | Language | CopyRight | Address of recorded file |
|---|---|---|---|---|---|
| DRAMA 1 | CH 05 Drama | 2008.05.07 13:00 | KR | CopyRight 2008 DRAMACH | 230.32.4.1 TV/CH05/DRAMA1 |
| MOVIE 1 | CH11 Movie | 2008.05.07 17:00 | KR | CopyRight 2008 MBC | 230.32.4.1 TV/CH11/MOVIE1 |
| NEWS 1 | CH03 News | 2008.05.07 15:00 | EN-US | CopyRight(c) CNN All Rights reserved | 230.32.4.1 TV/CH03/NEWS1 |
| | | .... | .... | .... | .... |

BROADCAST RECEIVING APPARATUS TO PROVIDE EXTERNAL DEVICES WITH A LIST OF RECORDED FILES, METHOD FOR PROVIDING RECORDED FILE, AND SYSTEM USING THE SAME

CROSS-REFERENCE TO RELATED APPLICATIONS

This application claims priority under 35 U.S.C. §119 from Korean Patent Application No. 10-2008-0049211, filed on May 27, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to a broadcast receiving apparatus, and a method and system for providing recorded files, and more particularly, to a broadcast receiving apparatus for providing external devices with files recording a broadcast program, and a method and system for providing recorded files.

2. Description of the Related Art

Recent technological advances related to televisions (TVs) have led to the development of TVs providing a pre-set recording function. A TV includes storage media such as a hard disc drive (HDD) or a memory therein, and a user stores files on which a broadcast program is recorded on the storage media, and thus may view the recorded program at a desired time.

Even if there are many channels, a user may record broadcast programs provided by various channels, and may view the recorded broadcast programs after the broadcast program has finished.

Multimedia apparatuses such as MP3 player or portable multimedia players by which a user can use multimedia content while moving, have become widely used. A user stores files containing recorded broadcast programs on a portable multimedia apparatus, and views the recorded broadcast programs using the portable multimedia apparatus while moving.

However, it is inconvenient for a user to check recorded programs and to store the programs on a multimedia apparatus.

Accordingly, methods for more conveniently using recorded files are required.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides a broadcast receiving apparatus which transmits a list of recorded files having information regarding an address at which the recorded files are stored to an external apparatus, and a method and system for providing a recorded file.

The present invention also provides a broadcast receiving apparatus which generates information regarding recorded files in eXtensible Markup Language (XML) format using electronic program guide (EPG) information.

According to an exemplary aspect of the present invention, there is provided a broadcast receiving apparatus, including an interface which communicates with an external apparatus; a storage unit which stores recorded files of recorded broadcast programs; and a control unit which generates a list of the recorded files comprising information regarding addresses at which the recorded files are stored, and controls the interface to transmit the generated recorded files list to the external apparatus.

The apparatus may further include a broadcast receiver which receives a broadcast program and electronic program guide (EPG) information, wherein the control unit generates the recorded files list based on the EPG information received through the broadcast receiver.

The control unit may control the interface to transmit the recorded files to the external apparatus through the interface.

The control unit may control the interface to transmit the recorded files selected from the recorded files list by a user to the external apparatus through the interface.

If the broadcast program received through the broadcast receiver is recorded, the control unit may determine whether a first file recording the broadcast program is transmitted to the external apparatus, and if it is determined that the first recorded file is transmitted to the external apparatus, the control unit may set the first file to a mode corresponding to the external apparatus.

If the recorded files stored in the storage unit are changed, the control unit may update the recorded files list.

The control unit may generate the recorded files list in eXtensible Markup Language (XML) format.

The control unit may control the recorded files list to be generated and transmitted to the external apparatus using a Really Simple Syndication (RSS) format.

The control unit may control the recorded files list and the recorded files to be transmitted to the external apparatus in a podcast format.

The information regarding addresses at which the recorded files are stored may include at least one of an Internet Protocol (IP) address of the broadcast receiving apparatus, a title of a folder in which the recorded files are stored, and a title of the recorded files.

According to an exemplary aspect of the present invention, there is provided a method for providing recorded files, including recording a received broadcast program, and storing the recorded files containing the received broadcast program; generating a list of recorded files comprising information regarding addresses at which the recorded files are stored; and transmitting the generated recorded files list to an external apparatus.

The method may further include receiving the broadcast program and electronic program guide (EPG) information, wherein the generating the list comprises generating the recorded files list based on the received EPG information.

The method may further include transmitting the recorded files to the external apparatus.

The recorded files are selected from the recorded files list by a user.

The method may further include determining, if the received broadcast program is recorded, whether a first file recording the broadcast program is transmitted to the external apparatus; and setting, if it is determined that the first recorded file is transmitted to the external apparatus, the first file to a mode corresponding to the external apparatus.

The method may further include updating, if the stored recorded files have changed, the recorded files list.

The generating the recorded files list, may include generating the recorded files list in eXtensible Markup Language (XML) format.

The generating the recorded files list and transmitting the generated recorded files list, may include generating the recorded files list using a Really Simple Syndication (RSS) format; and transmitting the generated recorded files list to the external apparatus.

The generating the recorded files list and transmitting the generated recorded files list, may include generating the recorded files list in a podcast format, and transmitting the generated recorded files list to the external apparatus; and transmitting the recorded files to the external apparatus in the podcast format.

The information regarding addresses at which the recorded files are stored may include at least one of an Internet Protocol (IP) address of a broadcast receiving apparatus, a title of a folder in which the recorded files are stored, and a title of the recorded files.

According to an exemplary aspect of the present invention, there is provided a broadcast receiving apparatus, including a broadcast receiver which receives electronic program guide (EPG) information; a storage unit which stores recorded files of recorded broadcast programs; and a control unit which generates information regarding the recorded files in eXtensible Markup Language (XML) format using the EPG information received through the broadcast receiver, and controls the information regarding the recorded files and the recorded files to be transmitted to an external apparatus.

The information regarding the recorded files may be in a Really Simple Syndication (RSS) format.

According to an exemplary aspect of the present invention, there is provided a broadcast receiving apparatus, including an interface which communicates with an external apparatus; a storage unit which stores multimedia content files; and a control unit which generates a list of the multimedia content files comprising information regarding addresses at which the multimedia content files are stored, and controls the generated multimedia content files list to be transmitted to the external apparatus.

According to an exemplary aspect of the present invention, there is provided a system for providing a recorded file, including a broadcast receiving apparatus which generates a recorded files list comprising part or all of an electronic program guide (EPG) information, and information regarding addresses at which recorded files are stored; a client application unit which receives the generated recorded files list and the recorded files from the broadcast receiving apparatus, and stores the received generated recorded files list and recorded files; and a multimedia apparatus which synchronizes with the client application unit, and downloads the received recorded files.

The broadcast receiving apparatus may transmit the recorded files list and the recorded files to the client application unit using a Really Simple Syndication (RSS) format.

BRIEF DESCRIPTION OF THE DRAWINGS

The above and/or other aspects of the present invention will be more apparent by describing certain exemplary embodiments of the present invention with reference to the accompanying drawings, in which:

FIG. 7 is a view illustrating items of a list of recorded files according to an exemplary embodiment of the present invention.

DETAILED DESCRIPTION OF EXEMPLARY EMBODIMENTS OF THE INVENTION

Figure 1:
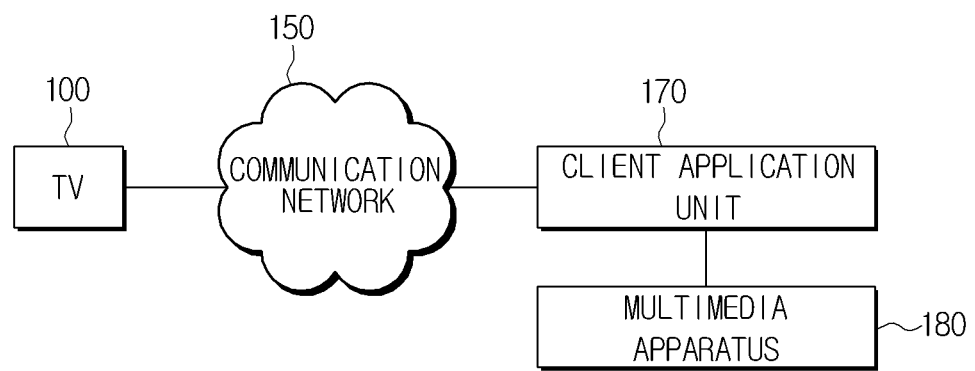
FIG. 1 is a view illustrating a system for providing a recorded file according to an exemplary embodiment of the present invention.

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

FIG. 1 is a view illustrating a system for providing a recorded file according to an exemplary embodiment of the present invention. Referring to FIG. 1, a system for providing a recorded file may include a television (TV) 100, a communication network 150, a client application unit 170, and a multimedia apparatus 180.

The TV 100 receives a broadcast program, records the broadcast program, and stores a file containing the recorded broadcast program. The TV 100 receives electronic program guide (EPG) information, and generates part or all of the EPG information, and a recorded file list having addresses at which the recorded files are stored.

The TV 100 transmits a recorded file list and stored recorded files to the client application unit 170 via the communication network 150. The communication network 150, to transmit the recorded files, should not be considered limiting. For example, the communication network 150 may include various different types of communication networks such as an internet or home network.

If a new recorded file is added, the TV 100 updates a recorded file list. The TV 100 transmits the recorded file list to the client application unit 170 in order to notify that the recorded file list is updated.

The TV 100 may transmit a recorded file list via the communication network 150, and generate the recorded file list in a language which may be parsed by both the TV 100 and the client application unit 170. Thus, the TV 100 may generate a recorded file list using a markup language or a programming language, for example eXtensible Markup Language (XML).

The TV 100 uses the Really Simple Syndication (RSS) format to generate and transmit a recorded file list. RSS is an XML-based document format for distributing web content. Accordingly, the TV 100 may generate a recorded file list in an RSS format. Services for providing content using RSS are referred to as RSS services, and include RSS 1.0, RSS 2.0, and ATOM.

The information required to generate a recorded file list is based on EPG information, however the user may manually input the information required to generate the recorded file list. The EPG information includes information regarding a recorded broadcast program, for example the title, the description, running time, or language. The recorded file list is generated by adding the EPG information to elements corresponding to the RSS format. The recorded file list may include the title, the description, publication date, language, copyright, or address of a recorded broadcast program.

The client application unit 170 is an apparatus for performing a client application. The client application unit 170 includes an application which receives a recorded file list via the communication network 150, and provides a user with the recorded file list.

If a plurality of TVs are connected to each other via the communication network 150, the client application unit 170 causes a user to check the recorded files stored in the respective TVs, and to select a desired TV.

As the client application unit 170 receives from the TV the recorded file list having information regarding an address at which the recorded files are stored, the client application unit 170 recognizes the address of the TV, or the type or position of recorded files stored on the TV 100. The client application unit 170 can determine which TV is selected from among the plurality of TVs.

The client application unit 170 receives recorded files from the selected TV 100. The client application unit 170 receives the recorded files stored in the TV 100, and stores the received files.

If a recorded file list of the TV 100 is updated, the client application unit 170 receives the updated recorded file list. The client application unit 170 determines which recorded files have changed by comparing the previous recorded file list with the updated recorded file list. The client application unit 170 may notify a user that the recorded file list of the TV 100 has been updated, and notifies the user which recorded files have been newly added or deleted.

In doing so, the recorded files stored in the TV 100 and the client application unit 170 are synchronized.

The client application unit 170 may selectively download part of the recorded files stored in the TV 100 without synchronizing the recorded files of the client application unit 170 with the recorded files of the TV 100.

The client application unit 170 is an apparatus for running an application. The client application unit 170 may generally be a computer. However, the client application unit 170 may also be built into the multimedia apparatus 180.

The client application unit 170 may be an application for receiving a podcast. The client application unit 170 for a podcast recognizes the TV 100 as a podcast server, and receives recorded files in a podcast format from the TV 100. iTunes is an example of a client application for a podcast.

The multimedia apparatus 180 receives recorded files from the client application unit 170. If the multimedia apparatus 180 is connected to the client application unit 170, the multimedia apparatus 180 is automatically synchronized with the client application unit 170, and receives recorded files from the client application unit 170. Without requiring additional operations, the multimedia apparatus 180 downloads recorded files simply by connecting the multimedia apparatus 180 to the client application unit 170. Therefore, a user can conveniently view the recorded files.

The multimedia apparatus 180 may be implemented so that after the multimedia apparatus 180 is connected to the client application unit 170, additional operations may be required in order to synchronize the multimedia apparatus 180 with the client application unit 170.

The multimedia apparatus 180 may generally be a portable multimedia apparatus. For example, the multimedia apparatus 180 may be a portable media player (PMP), an MPEG audio layer 3 (MP3) player, a portable phone, or a personal digital assistant (PDA).

Figure 2:
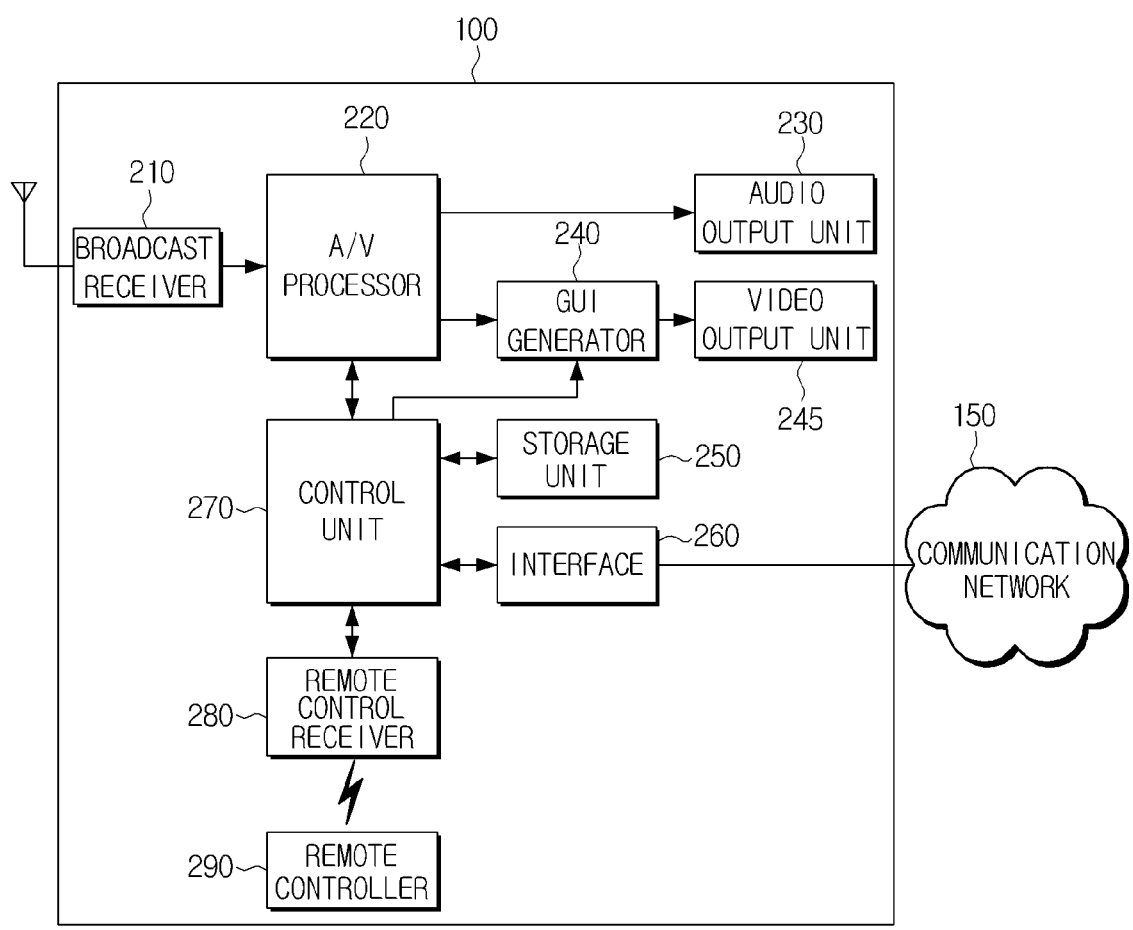
FIG. 2 is a block diagram illustrating a television (TV) according to an exemplary embodiment of the present invention.

The TV 100 will be explained in detail with reference to FIG. 2. FIG. 2 is a block diagram illustrating a television 100 (TV) according to an exemplary embodiment of the present invention.

Referring to FIG. 2, the TV 100 may include a broadcast receiver 210, an audio/video (A/V) processor 220, an audio output unit 230, a graphical user interface (GUI) generator 240, a video output unit 245, a storage unit 250, an interface 260, a control unit 270, a remote control receiver 280, and a remote controller 290.

The broadcast receiver 210 receives a broadcast from a broadcast station or satellite over wire or wirelessly, and demodulates the received broadcast. A broadcast signal transmitted to the broadcast receiver 210 includes Program and System Information Protocol (PSIP). The PSIP includes EPG information.

The A/V processor 220 processes a video signal and an audio signal input by the broadcast receiver 210 and the control unit 270 by performing video decoding, video scaling, and audio decoding. The A/V processor 220 transmits a video signal and an audio signal to the GUI generator 240 and the audio output unit 230, respectively.

If the received video and audio signals are stored in the storage unit 250, the A/V processor 220 transmits video and audio to the storage unit 250 in a compressed format.

The audio output unit 230 outputs the audio output from the A/V processor 220 via a speaker (not shown).

The GUI generator 240 generates a GUI to be provided to a user. The GUI generator 240 combines the generated GUI with video output from the A/V processor 220. The GUI generator 240 generates a GUI for the EPG using the received EPG information.

The video output unit 245 displays the video output from the A/V processor 220, or outputs the video to an external apparatus connected to an external output terminal, for example an external display (not shown).

The storage unit 250 stores recorded files regarding the broadcast program received from the broadcast receiver 210, and a recorded file list. The recorded file list may be written in an RSS format.

The recorded file means a file which is generated by recording a broadcast program. The recorded file may be a compressed file, and the recorded file list may be an XML document written in an RSS format, and having a list of recorded files and information regarding the respective recorded files.

The storage unit 250 may store various content files in addition to the recorded files. For example, the storage unit 250 may store multimedia content received from the communication network 150 via the interface 260.

The storage unit 250 outputs the stored recorded file to an external destination through the interface 260. The storage unit 250 may be implemented using a hard disc, which is a nonvolatile memory.

The interface 260 is used as a path for communication between the TV 100 and the client application unit 170. The interface 260 connects the TV 100 to the client application 170 so that the TV 100 can communicate with the client application unit 170 via the communication network 150, such as an internet or home network. The interface 260 transmits the recorded file list and the recorded files to the client application unit 170.

The remote control receiver 280 receives a user's input using the remote controller 290, and transmits a command corresponding to the input to the control unit 270.

The control unit 270 determines the user command in accordance with a user's manipulation transmitted from the remote controller 290, and controls overall operations of the TV 100 according to the user command.

The control unit 270 pre-sets recording based on the EPG information. If a broadcast program in which recording is pre-set is received from the broadcast receiver 210, the control unit 270 records the received broadcast program, and stores the broadcast program in the storage unit 250 in a recorded file format.

When a broadcast program has been recorded, the control unit 270 determines whether to transmit the recorded file to the client application unit 170. A user sets whether to transmit the recorded file to the client application unit 170.

Figure 5:
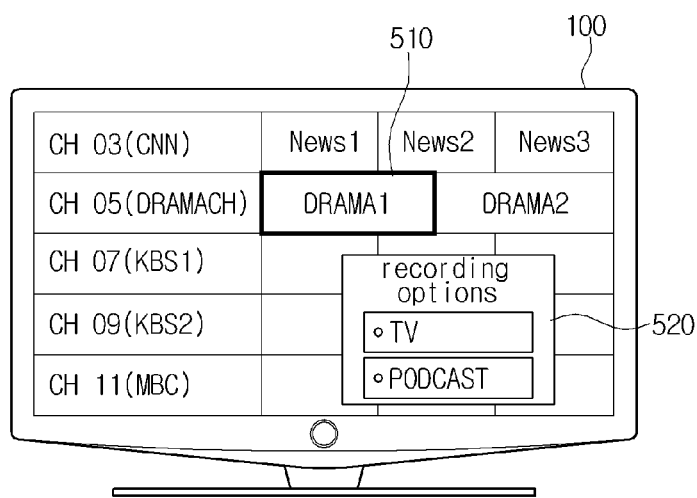
FIG. 5 is a view illustrating a screen on which recording options are displayed so that a user may select whether to use a recorded file as a podcast when pre-setting a recording function.

Referring to FIG. 5, a user selects whether to record a broadcast program in a TV mode or a PODCAST mode when pre-setting recording. If a user sets a broadcast program to be recorded to a TV mode, the file containing the recorded broadcast program is determined to be a file that is not to be transmitted to the client application unit 170, and if a user sets a broadcast program to be recorded to a PODCAST mode, the file containing the recorded broadcast program is determined to be a file to be transmitted to the client application unit 170.

If a broadcast program to be recorded is set as a file to be transmitted to the client application unit 170, that is the broadcast program is recorded in a PODCAST mode, the control unit 270 sets a recording mode to correspond to the multimedia apparatus 180. For example, if a broadcast program to be recorded is set as a file to be transmitted to the client application unit 170, the control unit 270 may adjust the resolution of video to fit onto a screen of the multimedia apparatus 180. As the screen of the portable multimedia apparatus 180 is generally smaller than that of the TV 100, the size of the video may be adjusted to fit onto the portable multimedia apparatus 180, and the video is recorded or the video may be recorded in full size and the adjusting of the video size may occur either by the TV 100 or the client application unit 170.

The control unit 270 generates a list of recorded files stored in the storage unit 250. The recorded file list includes information regarding the addresses at which recorded files are stored. The address information may include an Internet Protocol (IP) address of the TV 100, the title of a folder in which recorded filed are stored, and a recorded file title. For example, address information of a recorded file "DRAMA 1" includes a recorded file address "230.32.4.1" as the IP address of the TV 100, and a folder "TV/CH05/DRAMA1" stored in the storage unit 250 as shown in FIG. 7.

The recorded file list is generated in an RSS format. The RSS format should include a "link" element. If a recorded file list is written in an RSS format, an IP address of the TV 100, and the title of a folder in which the recorded files are stored, or a recorded file title may be recorded in the "link" element.

The control unit 270 generates a recorded file list based on the EPG information. The control unit 270 extracts information required to generate a recorded file list from the EPG information or may prompt the user to input the required information, and generates a recorded file list.

For example, the EPG information includes information such as the title, description, running time, or language of a recorded broadcast program. The recorded file list generated using RSS includes the title, description, publication date, language, copyright, or address at which a broadcast program is stored. The control unit 270 may record the title, description, language of a recorded file list using EPG information regarding the title, description, running time, or language.

The control unit 270 transmits a recorded file list to the client application unit 170 through the interface 260. If the recorded files stored in the storage unit 250 change, the control unit 270 updates a recorded file list, and stores the updated recorded file list in the storage unit 250. The control unit 270 transmits the updated recorded file list to the client application unit 170.

The control unit 270 transmits the generated recorded file list and the updated recorded file list to the client application unit 170, and thus a user may check files recorded on the TV 100, and determine which files are newly recorded through the client application unit 170.

If a user selects the TV 100 as a server through the client application unit 170, the control unit 270 transmits the recorded files stored in the storage unit 250 to the client application unit 170. The user can easily receive the newly recorded files.

A user receives the recorded files recorded on the TV 100 in a podcast format by the operation of the control unit 270.

Figure 3:
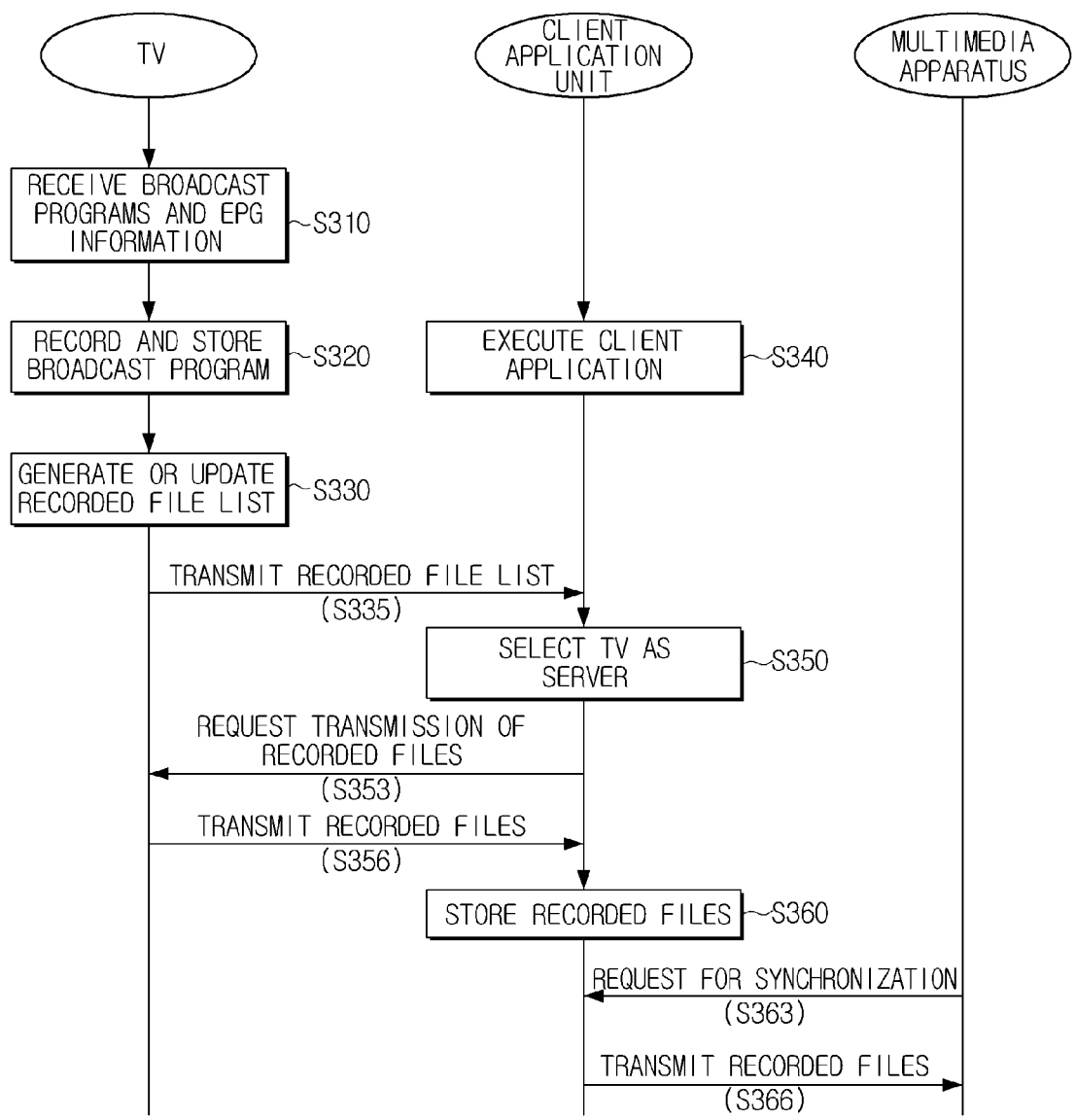
FIG. 3 is a flowchart provided to explain a method for providing a recorded file according to an exemplary embodiment of the present invention.

The process of providing recorded files on a system for providing recorded files will be explained with reference to FIG. 3. FIG. 3 is a flowchart provided to explain a method for providing recorded files according to an exemplary embodiment of the present invention.

The TV 100 receives broadcast programs and EPG information (S310). The TV 100 records a broadcast program which is pre-set by a user to be recorded or may be recorded manually by the user while watching a particular program, and stores a recorded file containing the broadcast program in the storage unit 250 (S320).

The TV 100 generates or updates a recorded file list (S330). The recorded file list is generated using RSS.

The TV 100 transmits the recorded file list to the client application unit 170 (S335), in order to notify the client application unit 170 that the recorded files of the TV 100 are generated or updated.

The client application unit 170 executes a client application in advance (S340). The client application performs the function of automatically downloading content from selected exterior servers. An application for a podcast is provided as an example of the client application.

If the client application unit 170 receives a recorded file list, the client application unit 170 determines that the TV 100 provides content. The client application unit 170 adds the TV 100 to a selectable server list.

A user selects the TV 100 as a server for receiving content using the client application unit 170 (S350). For example, the client application unit 170 may be implemented using a computer. In this case, the user may select the TV 100 as a server for a podcast using the computer.

The client application unit 170 requests the TV 100 to transmit the recorded files (S353). The TV 100 transmits the recorded files to the application unit 170 (S356). The client application unit 170 stores the received recorded files (S360).

If the multimedia apparatus 180 is connected to the client application unit 170, the multimedia apparatus 180 transmits a request for synchronization to the client application unit 170 (S363). The client application unit 170 transmits the stored recorded files to the multimedia apparatus (S366).

In doing so, the TV 100 operates as a server of a podcast. The user conveniently downloads files recorded on the TV 100 to the multimedia apparatus 180.

Figure 4:
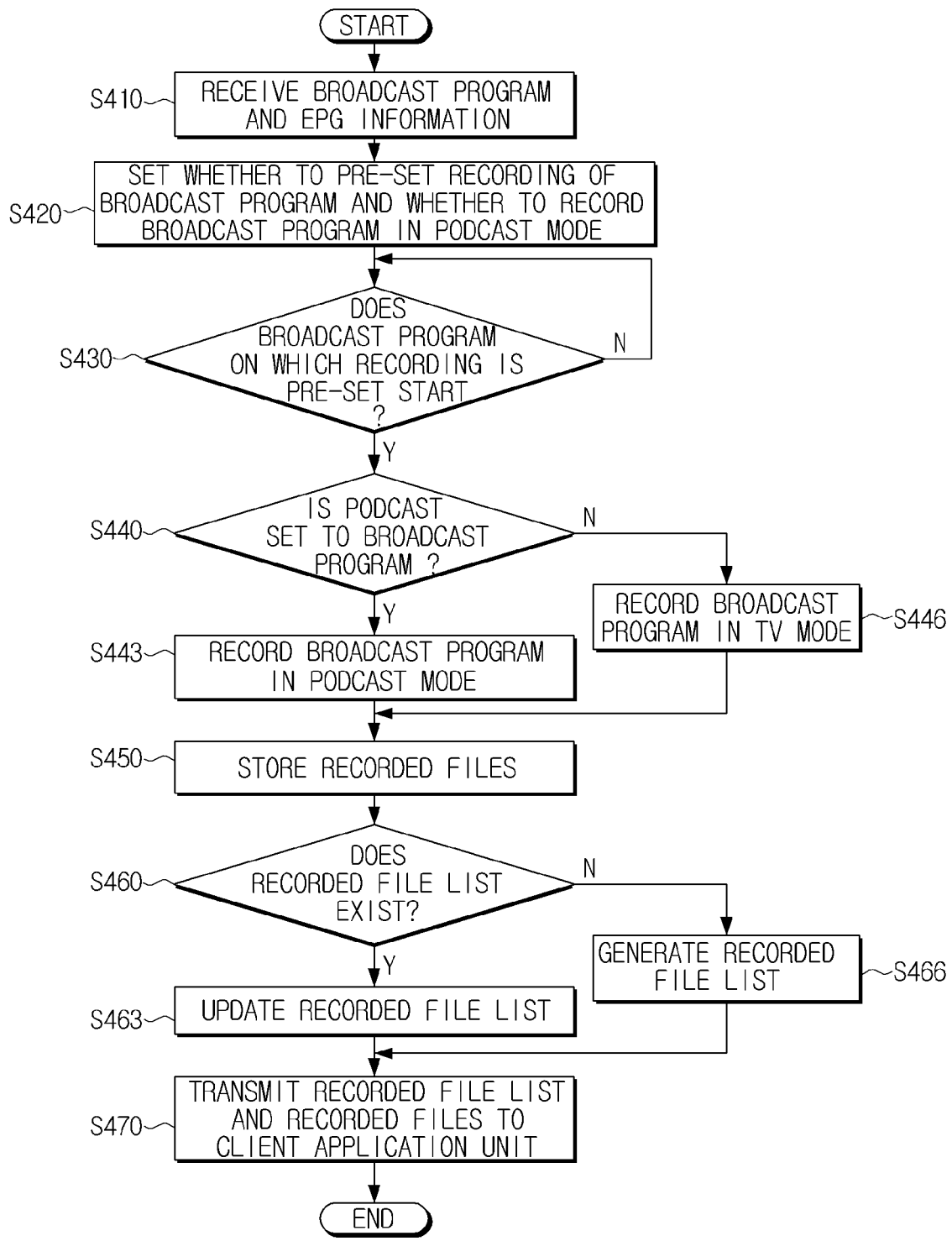
FIG. 4 is a flowchart provided to explain a method for providing a recorded file using a TV according to an exemplary embodiment of the present invention.

The operation of the TV 100 will be explained in detail with reference to FIG. 4. FIG. 4 is a flowchart provided to explain a method for providing recorded files using a TV according to an exemplary embodiment of the present invention.

The TV 100 receives a broadcast program and EPG information (S410). A user sets whether the TV 100 pre-sets recording of a broadcast program and whether to record a broadcast program in a podcast mode (S420). An EPG provides a screen to conveniently select whether to pre-set recording of a broadcast program, and whether to record a broadcast program in a podcast mode. Thus a user can conveniently select the modes. The above exemplary embodiment is illustrated in FIG. 5.

FIG. 5 is a view illustrating a screen on which recording options are displayed so that a user may select whether to use a recorded file as a podcast when pre-setting a recording function.

If a user selects a desired broadcast program while an EPG is displayed as shown in FIG. 5, the TV 100 pre-sets the selected broadcast program to be recorded. Referring to FIG. 5, a user selects a broadcast program DRAMA 1 510 on channel 5 (CH 05), and thus DRAMA 1 510 is selected as a broadcast program to be recorded.

If a user selects DRAMA 1 510, recording options 520 are displayed. The recording options 520 include an item "TV", and an item "PODCAST."

"TV" represents that a broadcast program is recorded to be played back on the TV 100. If "TV" is selected, a broadcast program is recorded without changing the quality of a video played back on the TV 100.

"PODCAST" represents that a broadcast program is recorded to be provided as a podcast. A recorded file to be provided through a podcast is played back on the client application unit 170 or the multimedia apparatus 180. If "PODCAST" is selected, a broadcast program is recorded at a video quality corresponding to the client application unit 170 or the multimedia apparatus 180. If a broadcast program is recorded for a podcast, the capacity of the recorded file is reduced, and thus file transmission is facilitated. However, even when the "PODCAST" is selected, the video may be recorded in full size even though the recorded file is designated as a "PODCAST" file. The adjusting of the video size may be done either by the TV 100 or the client application unit 170 or even by the multimedia apparatus 180.

The TV 100 determines whether to transmit a recording file to an external destination in accordance with the recording option as shown in FIG. 5.

The TV 100 determines whether a broadcast program on which recording is pre-set starts (S430). If a broadcast program on which recording is pre-set starts (S430-Y), the TV 100 determines whether a podcast is set to the broadcast program (S440). Whether a podcast is set to a broadcast program is determined according to the selection of the item "PODCAST" in FIG. 5.

If a podcast is set to a broadcast program (S440-Y), the TV 100 records the broadcast program in a podcast mode (S443). If a podcast is not set to a broadcast program (S440-N), the TV 100 records the broadcast program in a TV mode (S446).

The TV 100 stores the recorded files (S450). The TV 100 determines whether a recorded file list exists (S460).

If a recorded file list exists in the TV 100 (S460-Y), the TV 100 updates the recorded file list (S463). If a recorded file list does not exist in the TV 100 (S460-N), the TV 100 generates a recorded file list (S466). The TV 100 generates a recorded file list using EPG information, or updates the recorded file list. The processes will be explained in detail with reference to FIGS. 6 and 7.

Figure 6:
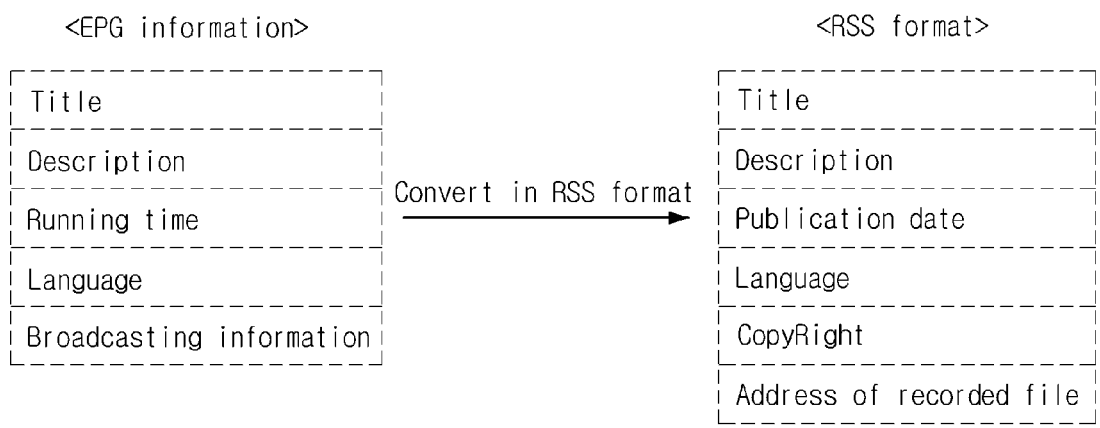
FIG. 6 is a diagram in which electronic program guide (EPG) information is converted into a Really Simple Syndication (RSS) format according to an exemplary embodiment of the present invention.

FIG. 6 is a diagram in which electronic program guide (EPG) information is converted into a Really Simple Syndication (RSS) format according to an exemplary embodiment of the present invention.

Referring to FIG. 6, the TV 100 converts EPG information into an RSS format, and generates a recorded file list. The EPG information includes broadcast information such as the title, description, running time, or language. A list of recorded files to be generated in an RSS format includes the title, description, publication date, language, copyright, or addresses of recorded files. The TV 100 may generate the title, description, publication date, or language of the recorded file list using EPG information such as the title, description, running time, or language.

The TV 100 generates a recorded file list in an RSS format using EPG information or the user may manually input the required information.

FIG. 7 is a view illustrating items of a list of recorded files according to an exemplary embodiment of the present invention. A recorded file list may include a title, a description, publication date, a language, copyright, or an address at which a broadcast program is stored. Referring to FIG. 7, a recorded file list is illustrated with information regarding DRAMA 1, MOVIE 1, and NEWS 1.

As the recorded file list includes information regarding addresses at which the recorded files are stored, the TV 100 notifies the client application unit 170 of the address of the TV 100, and the position of recorded files stored in the TV 100. The client application unit 170 determines the position of the recorded files using information regarding the addresses of the recorded files, and downloads the recorded files.

An RSS format is regulated to distribute web content, and includes RSS 1.0, RSS 2.0, and ATOM. According to the specifications of RSS 2.0, documents written in an RSS format include channel elements. Sub elements of channel elements are regularized as a title, description, publication date, language, copyright, and link. Accordingly, a recorded file list in an RSS format is generated by recording the title, description, publication date, language, copyright, and address of a recorded file to the sub-elements.

Returning to FIG. 4, the TV 100 transmits the recorded file list and the recorded files generated by performing the above processes to the client application unit 170 (S470).

Following the above operations, the TV 100 may provide the client application unit 170 with a recorded file list.

The TV 100 is provided as a broadcast receiving apparatus, but apparatuses for receiving broadcast other than the TV 100 may also be applied to the exemplary embodiment of the present invention. For example, the broadcast receiving apparatus may be a setup box or a digital multimedia broadcasting (DMB) receiving apparatus other than a TV.

The communication network 150 according to the exemplary embodiment of the present invention may also be applied to a home network or a telephone network instead of the internet.

The application unit 170 according to an exemplary embodiment of the present invention may be a computer such as a PC or a laptop computer, and may also be built into the multimedia apparatus 180.

Only the multimedia apparatus 180 plays back recorded files provided from the TV 100 in the exemplary embodiment of the present invention, but this should not be considered limiting. The multimedia apparatus 180 may also be a PMP, MP3 player, PDA, or a portable phone.

While the TV 100 provides recorded files in this exemplary embodiment of the present invention, any file for providing content other than the recorded files may be applied to the present invention. For example, the TV 100 may provide the client application unit 170 with files having data broadcast information or multimedia content files downloaded through the internet.

The recorded file list is generated in an RSS format using XML, but the present invention is not limited such a language. Languages used in the internet environment such as markup languages or program languages may also be used. For example, HyperText Markup Language (HTML) language may also be used instead of XML.

Exemplary embodiments of the present invention provide a broadcast receiving apparatus which transmits a list of recorded files having information regarding addresses at which recorded files are stored to an external apparatus, and a method and system for providing a recorded file.

If a multimedia apparatus is connected to a client application unit, a user can download recorded files from a TV through simple manipulation. Therefore, a user can conveniently use recorded files from a TV.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A broadcast receiving apparatus, comprising:
a broadcast receiver which receives a broadcast program,
an interface which communicates with an external apparatus;
a storage unit which stores recorded files of broadcast programs;
a video output unit which displays the received broadcast program; and
a control unit which generates a list of the recorded files comprising file addresses at which the recorded files are stored and a network address of the broadcast receiving apparatus, and controls the interface to transmit the generated recorded files list, and
wherein the external apparatus downloads the recorded files listed in the generated recorded files list using the file addresses and the network address, and
wherein the control unit is configured to determine a recording mode from among a podcast mode and a television (TV) mode, and
wherein if the recording mode is determined as the podcast mode, the control unit automatically sets a resolution for a recorded file of the received broadcast program based on the external apparatus, and if the recording mode is determined as the TV mode, the control unit automatically sets the resolution for the recorded file of the received broadcast program based on the video output unit.

2. The apparatus of claim 1,
wherein the list of the recorded files further comprises at least one of title, description, publication date, language and copyright of the recorded broadcast programs, and
wherein the control unit generates the list of the recorded files in Really Simple Syndication (RSS) format using EPG information received through the broadcast receiver.

3. The apparatus of claim 1, wherein the control unit controls the interface to transmit the recorded files to the external apparatus through the interface.

4. The apparatus of claim 3, wherein the control unit controls the interface to transmit the recorded files selected from the recorded files list by a user to the external apparatus through the interface.

5. The apparatus of claim 1, wherein if the recorded files stored in the storage unit are changed, the control unit updates the recorded files list.

6. The apparatus of claim 1, wherein the control unit generates the recorded files list in eXtensible Markup Language (XML) format.

7. The apparatus of claim 6, wherein the control unit controls the recorded files list to be generated and transmitted to the external apparatus using a Really Simple Syndication (RSS) format.

8. The apparatus of claim 1, wherein the control unit controls the recorded files list and the recorded files to be transmitted to the external apparatus in a podcast format.

9. The apparatus of claim 1, wherein the information regarding addresses at which the recorded files are stored comprises at least one of an Internet Protocol (IP) address of the broadcast receiving apparatus, a title of a folder in which the recorded files are stored, and a title of the recorded files.

10. A method for providing recorded files to an external apparatus from a broadcast receiving apparatus, the method comprising:
receiving a broadcast program;
displaying the received broadcast program by using a display apparatus;
determining a recording mode from among a podcast mode and a television (TV) mode;
recording the received broadcast program, and storing the recorded files containing the received broadcast program;
generating a list of recorded files comprising file addresses at which the recorded files are stored and a network address of the broadcast receiving apparatus;
transmitting the generated recorded files list to the external apparatus, and
wherein the external apparatus downloads the recorded files listed in the generated recorded files list using the file addresses and the network address, and
wherein if the recording mode is determined as the podcast mode, the recording the received broadcast program comprises automatically setting a resolution for a recorded file of the received broadcast program based on the external apparatus, and if the recording mode is determined as the TV mode, the recording the received broadcast mode comprises automatically setting the resolution for the recorded file of the received broadcast program based on the display apparatus.

11. The method of claim 10,
wherein the list of the recorded files further comprises at least one of title, description, publication date, language and copyright of the recorded broadcast programs, and
wherein the generating the list comprises generating the list of the recorded files in Really Simple Syndication (RSS) format using EPG information.

12. The method of claim 10, further comprising:
transmitting the recorded files to the external apparatus.

13. The method of claim 12, wherein the recorded files are selected from the recorded files list by a user.

14. The method of claim 10, further comprising:
updating, if the stored recorded files have changed, the recorded files list.

15. The method of claim 10, wherein the generating the recorded files list, comprises:

generating the recorded files list in eXtensible Markup Language (XML) format.

16. The method of claim 15, wherein the generating the recorded files list and transmitting the generated recorded files list, comprises:

generating the recorded files list using a Really Simple Syndication (RSS) format; and transmitting the generated recorded files list to the external apparatus.

17. The method of claim 10, wherein the generating the recorded files list and transmitting the generated recorded files list comprises:

generating the recorded files list in a podcast format, and transmitting the generated recorded files list to the external apparatus; and transmitting the recorded files to the external apparatus in the podcast format.

18. The method of claim 10, wherein the information regarding addresses at which the recorded files are stored comprises at least one of an Internet Protocol (IP) address of a broadcast receiving apparatus, a title of a folder in which the recorded files are stored, and a title of the recorded files.

19. A system for providing a recorded file, comprising:

a broadcast receiving apparatus which generates a recorded files list comprising part or all of an electronic program guide (EPG) information, file addresses at which recorded files are stored and network address of the broadcast receiving apparatus, and transmits the generated recorded files list;

a client application unit which receives the generated recorded files list, sets the broadcast receiving apparatus as a server and downloads the recorded files listed in recorded files list from the broadcast receiving apparatus using the file addresses and the network address, and stores the received generated recorded files list and the recorded files; and a multimedia apparatus which synchronizes with the client application unit, and downloads the received recorded files from the client application unit, and wherein the broadcast receiving apparatus is configured to determine a respective recording mode which corresponds to each of the recorded files from among a podcast mode and a television (TV) mode, and wherein if the recording mode is determined as the podcast mode for a respective recorded file, the broadcast receiving apparatus automatically sets a resolution for the respective recorded file based on the multimedia apparatus, and if the recording mode is determined as the TV mode for the respective recorded file, the broadcast receiving apparatus automatically sets the resolution for the respective recorded file based on the broadcast receiving apparatus.

20. The system of claim 19, wherein the recorded files list further comprises at least one of title, description, publication date, language and copyright of the recorded broadcast programs, and wherein the broadcast receiving apparatus generates the recorded files list in Really Simple Syndication (RSS) format using EPG information.

21. The method of claim 10, wherein the generating the list comprises generating the recorded files list based on a user input.

22. The method of claim 10, wherein if the recording mode is determined as the podcast mode, the recording of the received broadcast program occurs at a lower resolution than if the recording mode is determined as the TV mode.

23. The method of claim 10, wherein regardless of whether the recording mode is determined as the podcast mode or the TV mode, the recording of the received broadcast program occurs at a same resolution.

24. The method of claim 22, further comprising the step of:

transmitting the recorded received broadcast program to the external apparatus, wherein if the recording mode is determined as the podcast mode, the resolution of the received broadcast program is reduced before the recorded received broadcast program is transmitted to the external apparatus.

25. The method of claim 10, wherein the method is performed in a digital television broadcast receiver.

26. The method of claim 10, wherein the method is performed in a digital multimedia broadcasting (DMB) receiving apparatus.

* * * * *